United States Patent [19]

Ito

[11] Patent Number: 5,026,025
[45] Date of Patent: Jun. 25, 1991

[54] HOSE JOINT WITH OPENING-CLOSING VALVE

[75] Inventor: Hisayuki Ito, Suzuka, Japan

[73] Assignee: Tokai Rubber Industries, Ltd., Komaki, Japan

[21] Appl. No.: 420,900

[22] Filed: Oct. 13, 1989

[30] Foreign Application Priority Data

Oct. 14, 1988 [JP] Japan .................. 63-134845[U]
Oct. 14, 1988 [JP] Japan .................. 63-134846[U]

[51] Int. Cl.⁵ .................................................. F16L 37/40
[52] U.S. Cl. ........................................ 251/149.6; 285/86
[58] Field of Search .............. 137/614.04; 251/149.6; 285/86, 316, 362, 377

[56] References Cited

U.S. PATENT DOCUMENTS

| | | | |
|---|---|---|---|
| 2,727,759 | 12/1955 | Elliott .................. | 251/149.6 |
| 3,217,746 | 11/1965 | Voisine .................. | 137/614.04 |
| 3,537,730 | 11/1970 | Kresin .................. | 285/86 |
| 3,566,918 | 3/1971 | Rauen .................. | 137/614.04 |
| 3,583,667 | 6/1971 | Amneus .................. | 251/149.6 X |
| 4,541,457 | 9/1985 | Blenkush .................. | 285/317 X |
| 4,613,112 | 9/1986 | Philpot et al. .................. | 251/149.6 |
| 4,683,905 | 8/1987 | Vigneau et al. .................. | 251/149.6 X |
| 4,792,164 | 12/1988 | Medvick .................. | 285/316 X |

FOREIGN PATENT DOCUMENTS

2569253  2/1986  France .................. 285/316

Primary Examiner—Gerald A. Michalsky
Attorney, Agent, or Firm—Berman, Aisenberg & Platt

[57] ABSTRACT

A hose joint with an opening-closing valve comprises: a cylinder member having an axial bore, a center bore projecting from the inner surface of the axial bore in the direction of the center of the axis, and a ring-shaped valve seat in which one end surface of the valve seat constitutes a valve seating surface; a valve body comprising a shaft-shaped portion and a head portion formed at one end of the shaft-shaped portion, and an O-ring for sealing between the outer surface of the shaft-shaped portion and the inner surface of the center bore when the head portion is in contact with the valve seating surface; and a spring for urging the valve body in the direction of allowing the head portion of the valve body to come into contact with the valve seating surface. The operation of engaging an insert pipe member, fixed to a hose, with the cylinder member opens the valve seat and the valve body. Disengagement of the insert pipe member from the cylinder member closes the valve seat and the valve body. In a hose using the opening-closing valve, the axial bore is shut off by both the head portion and the O-ring of the valve body to provide a seal. The O-ring is replaceable.

2 Claims, 8 Drawing Sheets

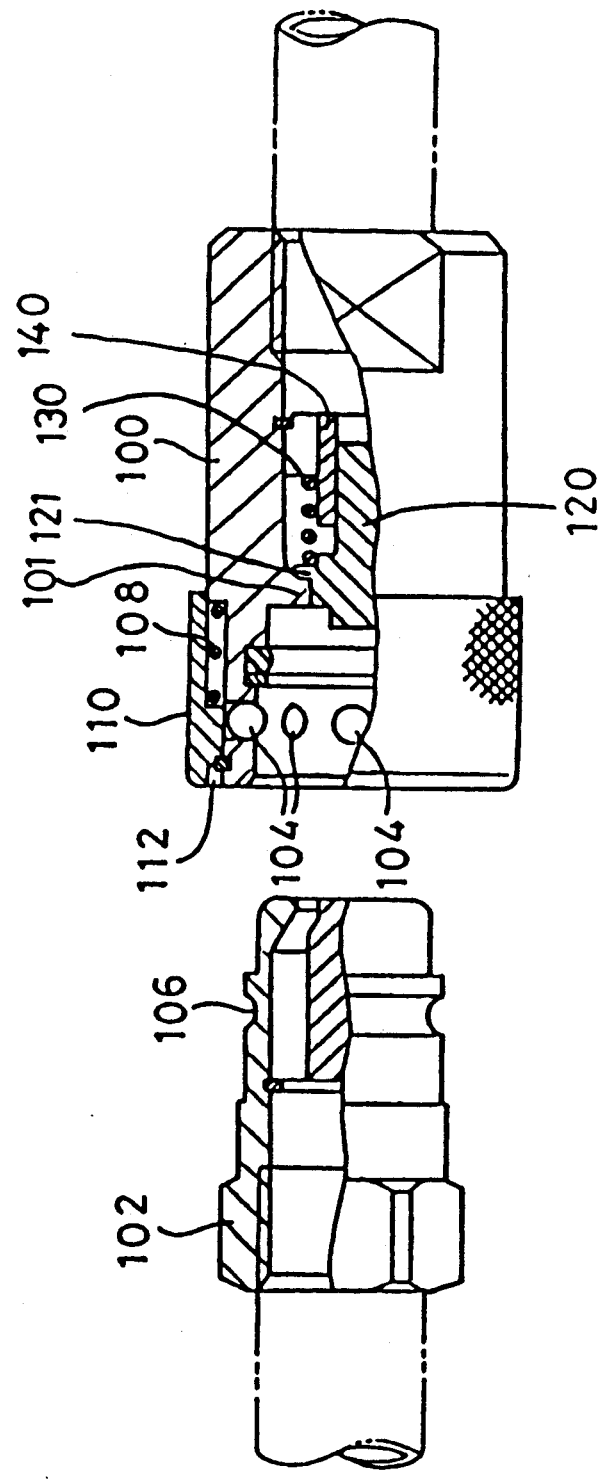

HOSE JOINT WITH OPENING-CLOSING VALVE

BACKGROUND OF THE INVENTION

1. Field of the Invention

This invention relates to a hose joint with an opening-closing valve.

2. Description of the Prior Art

A conventional hose joint for connecting a hose and a mating part comprises: a first joint member formed on or fixed to the mating part to be connected to the hose; and a second joint member fixed to an end of the hose.

In the conventional hose joint, an opening-closing valve is provided in the first joint member. A fluid path is opened by the action of the opening-closing valve when the hose is connected to the mating part, and the fluid path is closed when the hose is disconnected from the mating part. However, there is a possibility of a failure in which the fluid path is left open. If such is the case, fluid, such as water and the like, supplied from the mating part flows out through the fluid path when the hose is disconnected from the mating part.

By the way, the opening-closing valve of this type is disclosed in Japanese Unexamined Utility Model Publication, (KOKAI) No. 56281/1983, published Apr. 16, 1983, and illustrated in FIG. 10. In the conventional opening-closing valve, an increased-diameter portion 121 of a valve body 120 is forcibly seated on or separated from a valve seat 101 of a joint fixture 100 by exerting the urging force of a spring means 130 in the axial direction. Whereby the fluid path of the joint fixture 100 is opened and closed.

In the above-mentioned arrangement, it is difficult to achieve a high sealing property when the valve body 120 and a joint component member 140 are made of plastic in order to reduce their costs. Further, the sealing property might be degraded as the increased-diameter portion 121 of the valve body 120 is repeatedly brought into contact with the valve seat 101. In addition, in the above-mentioned arrangement, it is hard to recover the sealing property until the joint component member 104 is replaced with a new one.

SUMMARY OF THE INVENTION

This invention has been developed in order to solve the above-mentioned problems.

A hose joint with an opening-closing valve according to this invention comprises: a cylinder member formed on or fixed to a mating member to be connected to a hose and comprising an axial bore constituting a fluid path for letting fluid flow therein, a center bore projecting from the inner surface of the axial bore in the direction to the center of the axis and constituting a valve bore, and a ring-shaped valve seat, and one end surface of the valve seat constituting a valve seating surface; a valve body comprising a shaft-shaped portion to be inserted into the center bore of the cylinder member and a head portion formed integrally at one end of the shaft-shaped portion to be brought into contact with the valve seating surface, and an O-ring for sealing between the outer surface of the shaft-shaped portion and the inner surface of the center bore of the cylinder member when the head portion is in contact with the valve seating surface; and a spring means for urging the valve body in the direction of letting the head portion of the valve body bring into contact with the valve seating surface, wherein the engagement operation of an insert pipe member, fixed to the hose, with the cylinder member effects the movement of the cylinder member and the movement of the cylinder member effects the movement of the valve body in the axial direction against the urging force of the spring means, thereby opening the valve seat and the valve body, and the disengagement operation of the insert pipe member from the cylinder member effects to bring the valve body into contact with the valve seat by the urging force of the spring means, thereby closing the valve seat and the valve body.

In the opening-closing valve according to this invention, the fluid path is thus shut off by seating the head of the valve body on the valve seat. Simultaneously, the fluid path is also shut off by bringing the O-ring disposed around the shaft-shaped portion into contact with the inner surface of the valve seat center bore. Namely, the fluid path is shut off in a double manner. Therefore, a higher sealing property has been obtained when compared with the conventional opening-closing valve. Further, the sealing action, resulting from the contact between the head and the valve seat, a high pressure is prevented from exerting on the O-ring itself. Whereby damages to the O-ring is suppressed.

In addition, because the head of the valve body is made detachable in the opening-closing valve according to this invention, it is easy to replace the O-ring with new one when the O-ring has been damaged by repeatedly sliding on the inner surface of the valve seat center bore. Thus, the original high sealing property can be maintained for a long period of time.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 7 (B) is a front view, partly in section, of the engaging ring thereof;

FIG. 8 (B) is a front view, partly in section, of the locking ring thereof;

FIG. 8 (C) is another front view, partly in section, of the locking ring thereof;

FIG. 9 (B) is another explanatory cross-sectional view of the hose snap-action joint for explaining the connection sequence thereof;

FIG. 9 (C) is still another explanatory cross-sectional view of the hose snap-action joint for explaining the connection sequence thereof; and FIG. 10 is a front view, partly in section, of a conventional hose snap-action joint.

DESCRIPTION OF THE PREFERRED EMBODIMENT OF THE INVENTION

Having generally described this invention, a further understanding can be obtained by reference to a certain specific preferred embodiment which is provided herein for purposes of illustration only and is not intended to be limiting unless otherwise specified.

A preferred embodiment of this invention will be hereinafter described with reference to the drawings.

Figure 1:
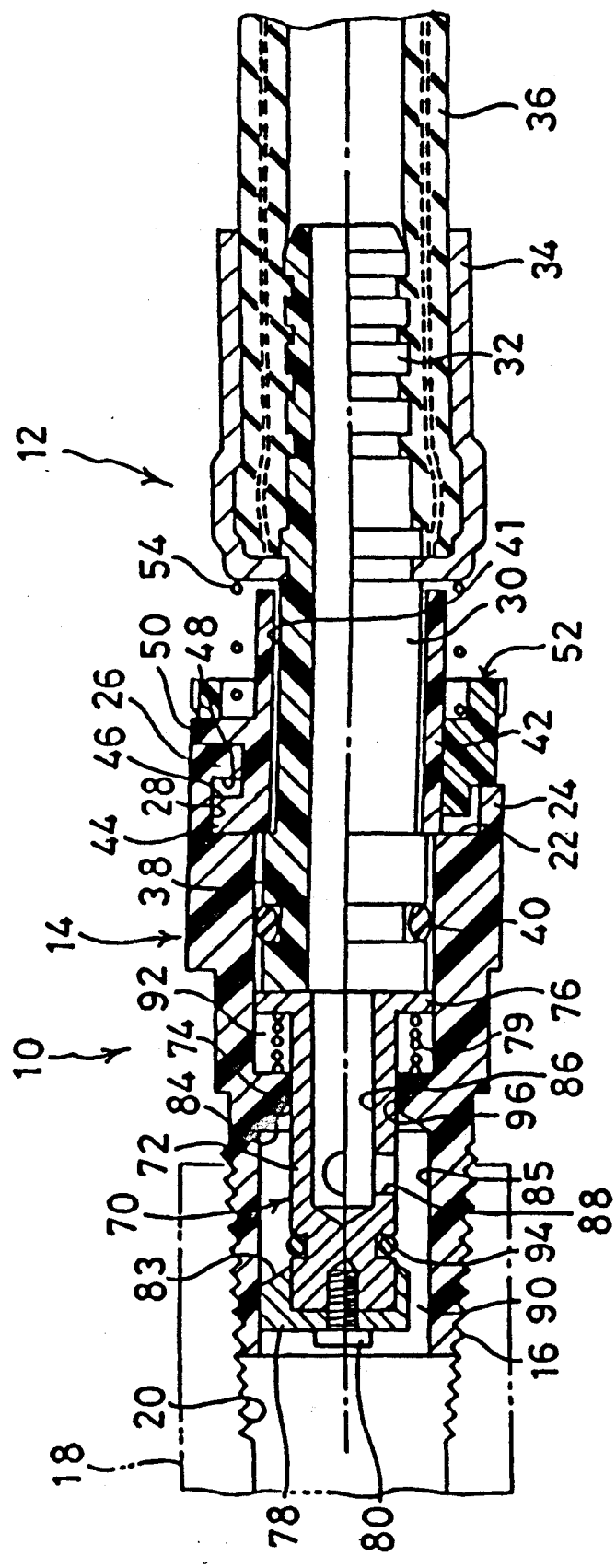
FIG. 1 is a cross-sectional view of a hose snap-action joint of a preferred embodiment according to this invention.

As shown in FIG. 1, a first joint member and a second joint member are designated at 10 and 12 respectively. The first joint member 10 comprises a cylinder member 14 made of polyamide resin. A taper male thread 16 is formed on the outer surface of the cylinder member 14 at the reduced diameter end. The taper male thread 16 is connected to a taper female thread 20 formed on the connection opening of a mating member 18, for instance a water supply manifold and the like, while interposed by a sealing member (not shown).

Figure 6:
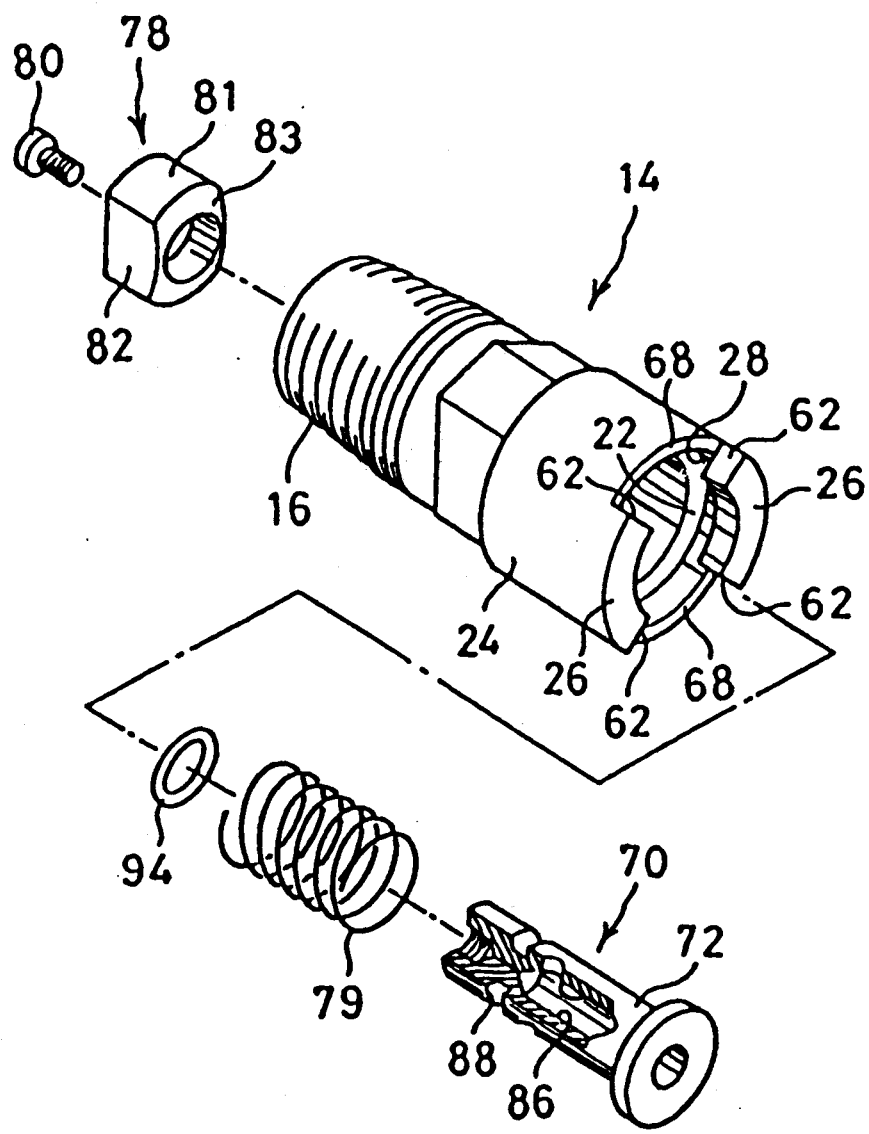
FIG. 6 is an exploded perspective view of the other joint member thereof and the opening-closing valve incorporated therein.

A stepped surface 22 and a periphery wall portion 24 are formed at the increased diameter end of the cylinder member 14, and, as shown in FIG. 6, a pair of arc-shaped inwardly-directing portions 26 projecting in the radial direction thereof inwardly is further formed at the end of the periphery wall portion 24. A pair of arc-shaped grooves 28 are further formed between the inwardly-directing engaging portions 26 and the stepped surface 22.

The second joint member 12 comprises an insert pipe member 30 made of polyamide resin and of a hollow cylinder shape. A convexed-concaved portion 32 are formed at one end of the insert pipe member 30. The convexed-concaved portion 32 and a socket fixture 34 made of aluminum hold the end of a hose 36, thereby fixing the insert pipe member 30 to the hose 36. A head portion 38 is formed at the other end of the insert pipe member 30, and adapted to engage with the inner surface of the cylinder member 14 in a water-proof manner by way of an O-ring 40 installed therearound.

Figure 7A:
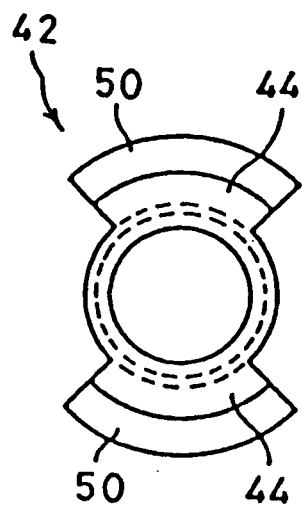
FIG. 7 (A) is a side view of an engaging ring i.e., an engaging member, of the hose snap-action joint illustrated in FIGS. 1, 2 and 5.
Figure 7B:
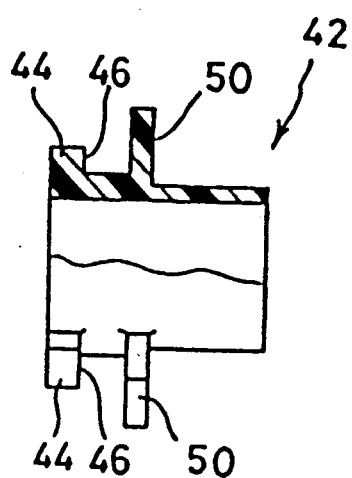

Around the outer wall of the insert pipe member 30, an engaging ring 42, i.e., an engaging member, made of polyamide resin is installed around a convexed portion 41 formed between the head portion 38 and the socket fixture 34. The engaging ring 42 is installed around the convexed portion 41 rotatably but in a manner relatively unmovable in the axial direction with respect to the insert pipe member 30. As detailed in FIGS. 5 and 7, a pair of arc-shaped outwardly-directing engaging portions 44 are formed at one end of the engaging ring 42. Engaging surfaces 46 (shown in FIGS. 1 and 7), facing in the direction perpendicular to the axial direction, of the outwardly-directing engaging portions 44 is are adapted to engage with engaging surfaces 48 (shown in FIGS. 1 and 3), facing in the direction perpendicular to the axial direction, of the inwardly-directing engaging portions 26. In addition, a pair of guide-stopper portions 50 is formed at an intermediate position of the engaging ring 42 in the axial direction.

Figure 5:
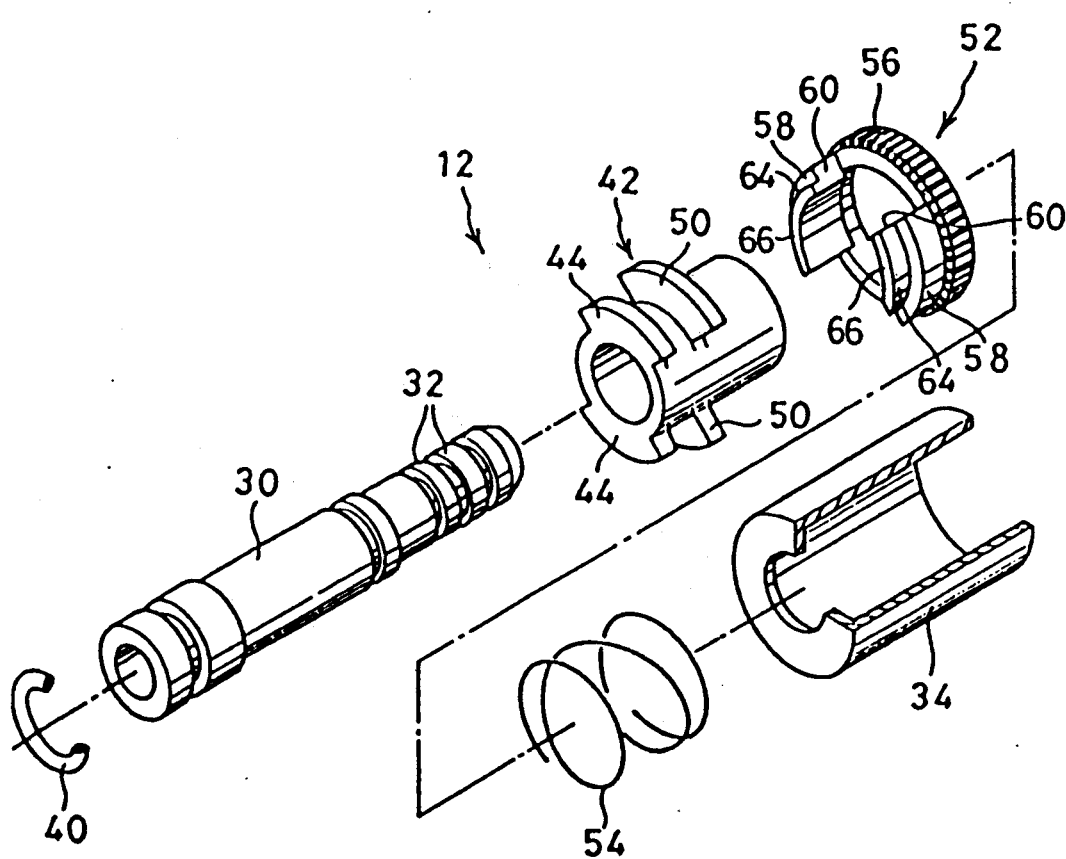
FIG. 5 is an exploded perspective view of a joint member of the hose snap-action joint.
Figure 8A:
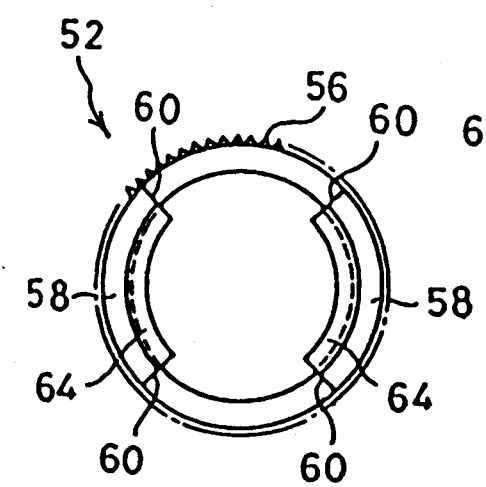
FIG. 8 (A) is a side view of a locking ring of the hose snap-action joint illustrated in FIGS. 1, 2 and 5.
Figure 8B:
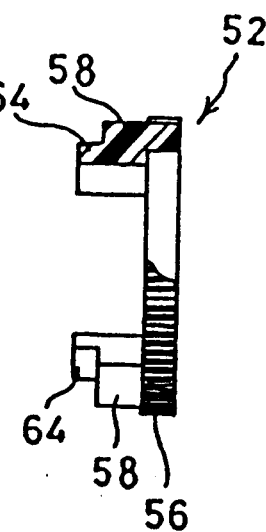
Figure 8C:
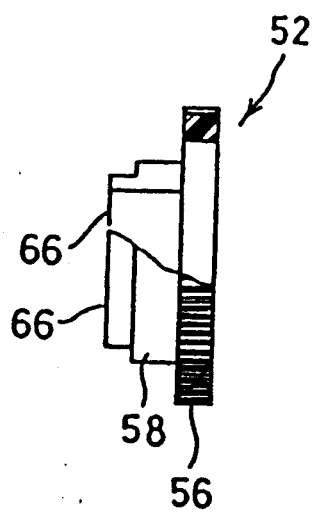

Around the outer wall of the engaging ring 42, a locking ring 52 made of polyamide resin is disposed in a manner relatively movable in the axial direction but unrotatably with respect to the engaging ring 42. The locking ring 52 is urged in the direction to the cylinder member 14 by a spring 54 disposed therearound. As shown in FIGS. 5 and 8, the locking ring 52 comprises an operating knob portion 56 and a pair of arc-shaped locking portions 58 projecting in the axial direction. The operating knob 56 has concaved-convexed portion on the outer wall thereof. The locking portions 58 are formed in a size and at positions so that they are snugly inserted into the indentations formed between the pair of the outwardly-directing portions 44 and the pair of the guide-stopper portions 50 of the engaging ring 42. The locking portions 58 are kept inserted into the indentations between the pair of the guide-stopper portions 50 when the locking ring 52 is fully pressed in the leftward direction in FIG. 1. The locking portions 58 are also kept inserted into the indentations between the pair of the guide-stopper portions 50 when the locking ring 52 is fully retracted against the urging force of the spring 54 in the rightward direction in FIG. 1. The engaging ring 42 and the locking ring 52 are thus made rotatable integrally by the engagement between the guide-stopper portions 50 and the locking portions 58.

The locking portions 58 are inserted into the indentations, i.e., the locking grooves 68 (shown in FIG. 6), between the inwardly-directing engaging portions 26 of the cylinder member 14 when the locking ring 52 is turned by a predetermined angle together with the engaging groove 42. The end surfaces 60 facing in the peripheral direction are brought into contact with the end surfaces 62 (shown in FIG. 6), facing in the peripheral direction, of the cylinder member 14, thereby preventing the locking ring 52 and the engaging ring 42 from relatively turning with respect to the cylinder member 14.

As detailed in FIG. 5, reduced-diameter portions 64 are formed at the end of the locking portions 58. The reduced-diameter portions 64 are engaged with the inner surface of the periphery wall portion 24 of the cylinder member 14 when the entire locking portions 58 are inserted into the locking grooves 68 (shown in FIG. 6) of the cylinder member 14. The end surfaces 66, facing in the axial direction, of the reduced-diameter portions 58 are got over the end surface, facing in the axial direction, of the cylinder member 14, i.e., the surfaces of the inwardly-directing engaging portions 26, when the locking ring 52 is retracted in the rightward direction and turned by a predetermined angle.

As shown in FIGS. 1, 3, 4 and 6, an opening-closing valve 70 is disposed in the cylinder member 14. The opening-closing valve 70 has a valve body 72, and the valve body 72 is made slidable in the axial direction in the center bore of a valve seat 74 formed on the inner surface of the cylinder member 14. The valve body 72 has a flange 76 at the right end thereof in the Figures, and is urged at the flange 76 in the right direction by a spring 79. At the other end of the valve body 72, a stopper block 78 is fixed by a screw 80. As shown in FIG. 6, the stopper block 78 has arc-shaped surfaces 81 and flat cut-off surfaces 82. The arc-shaped surfaces 81 engage slidably with the inner surface of a primary fluid chamber 90 (shown in FIG. 1) defined by the valve seat 74. Clearances 85, i.e., a fluid path, are formed between the cut-off surfaces 82 and the inner surface of the cylinder member 14.

The stopper block 78 is formed in a taper surface 83 at the right end thereof in the Figures. The taper surface 83 is brought into close contact with a taper surface 84 of the valve seat 74 formed correspondingly thereto, thereby closing the fluid path.

The valve body 72 is further provided with a fluid path 86 extending in the axial direction thereof and an opening 88 communicating the fluid path 86 and the primary fluid chamber 90. The position of the opening 88 is determined so that it operates in the following manner: When the valve body 72 is pressed in the leftward direction in the Figures, the opening 88 communicates with the primary fluid chamber 90, and when the pressing force is removed and the valve body 72 is retracted by the spring 79 in the rightward direction in the Figures, the opening 88 communicates with a secondary fluid chamber 92.

Figure 3:
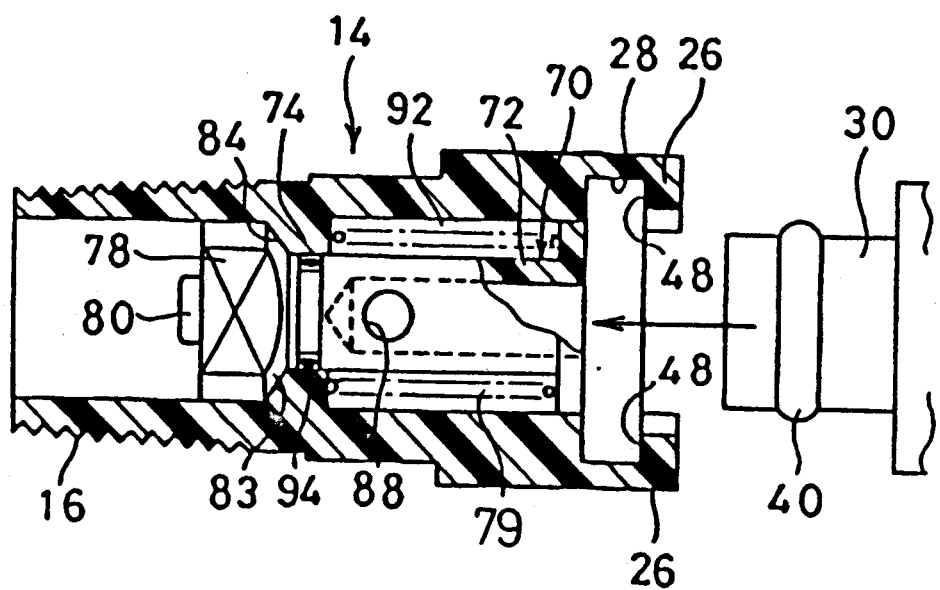
FIG. 3 is a cross-sectional view of an opening-closing valve incorporated in the hose snap-action joint thereof and its periphery portion.
Figure 4:
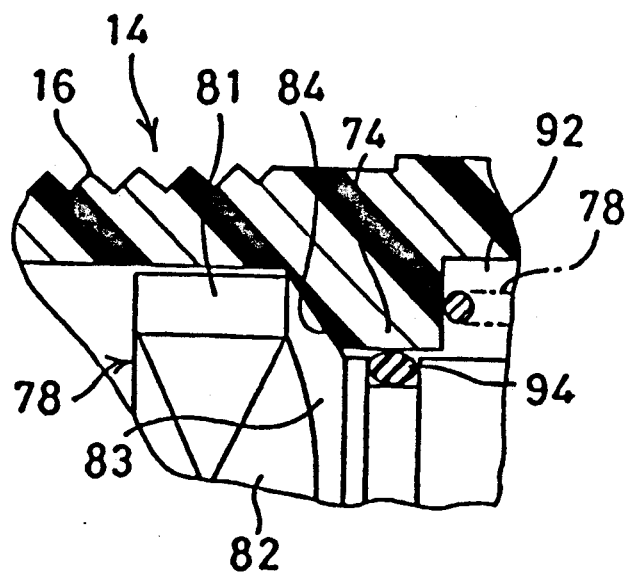
FIG. 4 is an enlarged cross-sectional view of the major portion of FIG. 3.

An O-ring 94 is installed around the valve body 72 at the end thereof in the vicinity of the stopper block 78. The O-ring 94 is brought into close contact with the center bore inner surface 96 of the valve seat 74 in a water-proof manner, thereby closing the fluid path. The fluid path is thus closed twice by the taper surface 83 of the stopper block 78 and the O-ring 94 in this preferred embodiment as shown in FIGS. 3 and 4.

The procedure of connecting the hose 36 with the mating member 18 by using the hose snap-action joint of this preferred embodiment and the operations of the joint component members will be hereinafter described.

As shown in FIG. 6, the valve body 72 with the spring 79 installed around is inserted into the cylinder member 14 from the opening at the increased-diameter end thereof. The stopper block 78 is inserted into the cylinder member 14 from the opening at the reduced-diameter end thereof, and is fixed by the screw 80 at the end of the valve body 72. The opening-closing valve 70 is thus assembled in the cylinder member 14. When assembled, the stopper block 78 is brought into close contact with the valve seat 74 by the urging force of the spring 79, the O-ring 94 is brought into close contact with the center bore inner surface 96 of the valve seat 74, and the opening 88 communicates with the secondary fluid chamber 92 as shown in FIG. 3, but the primary fluid chamber 90 and the secondary fluid chamber 92 are shut off.

Then, the first joing member 10, namely the cylinder member 14 with the opening-closing valve 70 assembled, is connected to the mating member 18 by the threads 16 and 20 while being interposed by a sealing member (not shown). Thus, the mating member 18 is ready for the connection to the hose 36 by way of the cylinder member 14. Thereafter, the second joint member 12 is connected to the cylinder 14. The connecting operation is done as follows.

Figure 2:
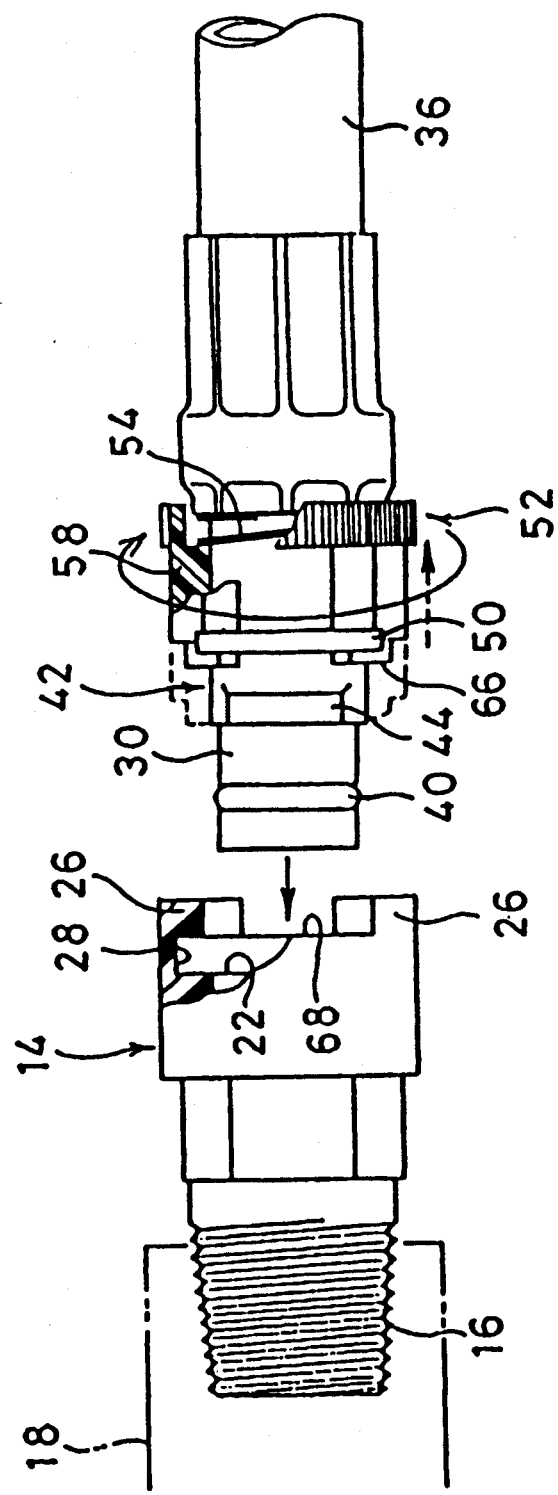
FIG. 2 is a front view, partly in section, of the hose snap-action joint of FIG. 1 disconnected into joint members.
Figure 9A:
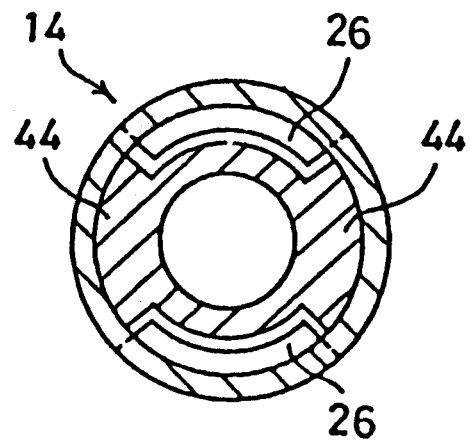
FIG. 9 (A) is an explanatory cross-sectional view of the hose snap-action joint for explaining the connection sequence thereof.
Figure 9B:
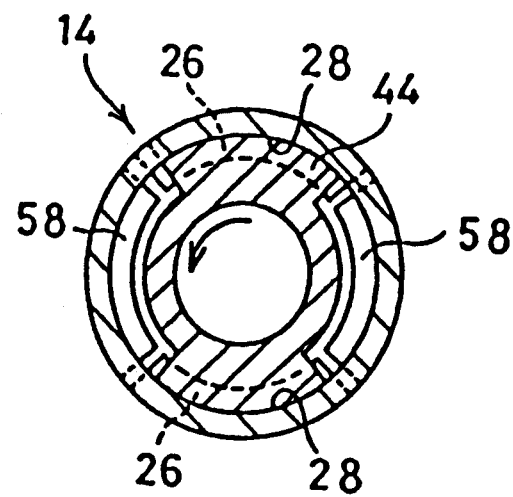
Figure 9C:
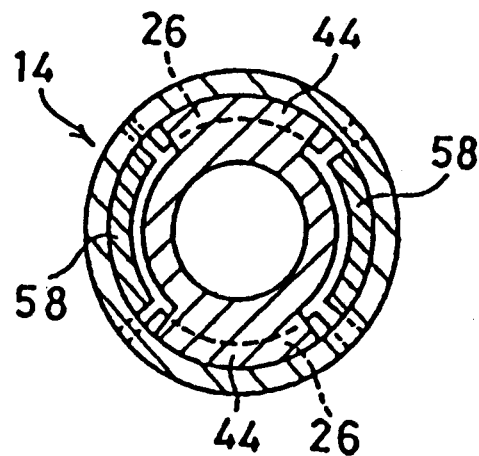

As shown in FIG. 2 and 9 (A), the angle position of the engaging ring 42 and the locking ring 52 is determined by turning them so that the arc-shaped outwardly-directing engaging portions 44 of the engaging ring 42 face the locking groove 68 the cylinder member 14. At the angle position, the locking ring 52 is retracted in the right direction in FIG. 2 against the urging force of the spring 54, and the insert pipe member 30 is inserted into the cylinder member 14. Then, the locking ring 52 is turned in the clockwise direction by applying force to the operating knob portion 56.

When the locking ring 52 and the engaging ring 42 are turned integrally to a position deviating from the original position by the phase of 90 deg., the outwardly-directing engaging portions 44 of the engaging ring 42 completely get into the arc-shaped grooves 28 of the cylinder member 14 as shown in FIGS. 1 and 9 (B), and engage with the inwardly-directing engaging portions 26 of the cylinder member 14. At the same time, the outwardly-directing engaging portions 44 get on the end surfaces, facing in the axial direction, of the inwardly-directing engaging portions 26 of the cylinder member 14. The locking portions 58 of the locking ring 52 reach at the positions corresponding to the locking grooves 68 of the cylinder member 14 as shown in FIG. 9 (B). Then, the entire locking ring 52 is pressed by the urging force of the spring 54 in the leftward direction in FIG. 1, and the locking portions 58 are engaged with the locking grooves 68 as shown in FIG. 9 (C). Namely, the relative rotation of the locking ring 52 and engaging ring 42 with respect to the cylinder member 14 or vice versa has been thus prohibited by the action of contact between the periphery end surfaces 60 of the locking portions 58 (shown in FIG. 5) and the periphery end surfaces 62 of the locking grooves 68 or the periphery end surfaces 62 of the inwardly-directing engaging portions 26 (shown in FIG. 6). The first joint member 10 and the second joint member 12 have been thus connected undetachably.

When the insert pipe 30 has been inserted, as shown in FIG. 1, the valve body 72 of the opening-closing valve 70 is pressed in the leftward direction by the head 38 of the insert pipe member 30. Whereby the opening 88 having been originally communicating with the secondary fluid chamber 92 comes to communicate with the primary fluid chamber 90. Thus, the primary fluid chamber 90 communicates with the inside of the insert pipe member 30, i.e., the inside of the hose 36, and the fluid in the primary fluid chamber 90 flows into the hose 36.

In the hose snap-action joint of this preferred embodiment, since the engaging ring 42 and the locking ring 52 can rotate relatively with respect to the insert pipe member 30 or the hose 36, the hose 36 cannot be twisted when connecting the first joint member 10 with the second joint member 12 by turning the engaging ring 42 and the locking ring 52. Accordingly, the connecting operation is easy, and the hose 36 is less likely to be damaged during the connecting operation.

The procedure of connecting the first joint member 10 and the second joint member 12 and the operations of the joint component members have been described so far. The disconnection of the first joint member 10 and the second joint member 12 can be done in the order reversing the above-mentioned connecting procedure.

Namely, the locking ring 52 is first retracted in the rightward direction in FIG. 1 to disengage the locking portions 58 from the locking grooves 68. Then, the locking ring 52 together with the engaging ring 42 are turned by 90 deg. in the counterclockwise direction. When the locking ring 52 and the engaging ring 42 have been turned by 90 deg. from the engaging position in the counterclockwise direction, the axial engagement between the inwardly-directing engaging portions 26 and the outwardly-directing engaging portions 44 are disengaged completely. Thus, the insert pipe member 30 can be removed from the cylinder member 14.

When the insert pipe member 30 has been removed, the valve body 72 of the opening-closing valve 70 is retracted in the rightward direction in FIG. 1 by the urging force of the spring 79. The taper surface 83 of the stopper block 78 is brought into close contact with the taper surface 84 of the valve seat 74, and the O-ring 94 is brought into close contact with the center bore inner surface 96 of the valve seat 74. Thus, the primary fluid chamber 90 and the secondary fluid shaft 92 are shut off completely.

As described above, the stopper block 78 of the valve body 72 as the increased-diameter head portion is seated on the valve seat 74, and the O-ring 94 is brought into close contact with the inner surface 96 of the center bore of the valve seat 74 in this preferred embodiment. Whereby the fluid path is sealed twice, and a high sealing property is obtained when shutting the fluid path off.

In addition, because the stopper block 78 is made detachable, it is easy to replace the O-ring 94 with new one when the O-ring 94 has been damaged. Namely, the O-ring 94 can be replaced with ease after removing the stopper block 78, and the replacement has been thus simplified by the detachable stopper block 78. As a result, a temporary sealing property deterioration, resulting from the damaged O-ring 94, the original sealing property can be recovered readily.

One of the preferred embodiments of this invention has been detailed so far, but this invention is not limited thereto and may be realized in other forms. For instance, in this invention, the mating member may be the above-mentioned connection opening of the manifold for the water supply apparatus or other mating members such as an end of a hose and the like. Further, the joint members and the way of joining may be realized in other forms depending on the requirements.

Having now fully described the invention, it will be apparent to one of ordinary skill in the art that many changes and modifications can be made thereto without departing from the spirit or scope of the invention as set forth herein.

What is claimed is:

1. A hose joint having an opening-closing valve comprising:
    a cylinder member having a valve seat extending in a radial direction from an intermediate portion of an inner cylindrical surface of said cylinder member, wherein said valve seat comprises a center bore connecting a primary liquid chamber of said cylinder member to a secondary liquid chamber of said cylinder member;
    an insert pipe member connected to an end of a hose and capable of being inserted into said secondary liquid chamber;
    a valve body inserted in said primary and secondary liquid chambers and said center bore of said cylinder member, wherein a stopper block comprising an end portion of said valve body in said primary liquid chamber has a larger diameter than an intermediate portion of said valve body;
    an O-ring seated in a groove in an outer surface of said valve body between said stopper block and said valve seat;
    spring means for urging said valve body in a direction toward said insert pipe member inserted in said secondary liquid chamber of said cylinder member;
    wherein said valve body and said cylinder member form a double seal and water flow ceases when said spring means closes said cylinder member by urging said stopper block against said valve seat, a radially extending surface of said stopper block mating with a radially extending surface of said valve seat to form one seal of said double seal, and by inserting said O-ring into said center bore against an inner surface of said valve seat, to form the other seal of said double seal whereby said insert pipe member is not in communication with said secondary liquid chamber, and
    wherein when said spring means is compressed, water flow takes place through said cylinder member by separating said stopper block from said valve seat and by separating said O-ring from said center bore when said insert pipe member pushes against said valve body.

2. A hose joint having an opening-closing valve according to claim 1, wherein a tapered surface of said valve seat and a tapered surface of said stopper block mate with each other in an oblique radial direction to facilitate inserting said O-ring into said center bore against an inner surface of said valve seat, whereby water flow is stopped.

* * * * *